United States Patent [19]

Giebeler et al.

[11] Patent Number: 4,846,773

[45] Date of Patent: Jul. 11, 1989

[54] ROTATING SYSTEM CRITICAL SPEED WHIRL DAMPER

[75] Inventors: Robert H. Giebeler, Cupertino; Kenneth K. Inouye, Redwood City, both of Calif.

[73] Assignee: Beckman Instruments, Inc., Fullerton, Calif.

[21] Appl. No.: 133,184

[22] Filed: Dec. 14, 1987

Related U.S. Application Data

[63] Continuation of Ser. No. 733,162, May 13, 1985, abandoned.

[51] Int. Cl.[4] ........................ B04B 9/04; B04B 13/00; F16F 15/00

[52] U.S. Cl. .......................................... 494/82; 494/1; 494/83

[58] Field of Search .......................... 494/1, 9, 82, 83; 384/260, 627, 252, 264; 74/574, 573. R; 464/180

[56] References Cited

U.S. PATENT DOCUMENTS

| | | | |
|---|---|---|---|
| 886,921 | 5/1908 | Bailey | 494/83 X |
| 1,502,677 | 7/1924 | Law | 74/573 X |
| 2,951,731 | 9/1960 | Rushing | 494/14 X |
| 2,961,277 | 11/1960 | Sternlicht | 384/99 |
| 3,097,167 | 7/1963 | Beyerle | 494/82 X |
| 3,322,338 | 5/1967 | Stallman et al. | 494/12 X |
| 3,430,852 | 3/1969 | Lenkey et al. | 494/82 X |
| 3,786,694 | 1/1974 | Willeitner | 74/573 |
| 3,902,659 | 9/1975 | Brinkmann et al. | 494/82 |
| 3,958,753 | 5/1976 | Durland et al. | 494/16 X |
| 4,023,438 | 5/1977 | Birkle et al. | 74/574 |
| 4,136,841 | 1/1979 | Fohl | 464/180 X |
| 4,205,779 | 6/1980 | Jacobson | 494/14 X |
| 4,236,426 | 12/1980 | Meinke et al. | 464/180 X |

FOREIGN PATENT DOCUMENTS

| | | | |
|---|---|---|---|
| 1143150 | 1/1963 | Fed. Rep. of Germany | 494/82 |

*Primary Examiner*—Harvey C. Hornsby
*Assistant Examiner*—Scott J. Haugland
*Attorney, Agent, or Firm*—William H. May; Paul R. Harder

[57] ABSTRACT

A centrifuge system includes a drive shaft bearing mounted to a drive shaft for engaging a solenoid actuated plunger in low friction contact over a predetermined angular velocity range of the drive shaft. The drive shaft bearing includes a frustoconical bearing surface that contacts a plunger bearing mounted in an end of the plunger when the solenoid actuates the plunger. The frustoconical bearing surface transforms vibrations of the drive shaft transverse to its axis of rotation into linear motion of the plunger relative to the drive shaft. The plunger is mounted inside the solenoid such that the solenoid, the plunger and the drive shaft are substantially concentric. The plunger is movable in the solenoid in response to application of an appropriate electrical current to the solenoid. However, the plunger fits sufficiently close within the solenoid that the force movement of the plunger arising from contact with the vibrating drive shaft bearing is damped by friction between the solenoid and the plunger.

7 Claims, 1 Drawing Sheet

ROTATING SYSTEM CRITICAL SPEED WHIRL DAMPER

This is a continuation of application Ser. No. 733,162, filed May 13, 1985, now abandoned.

BACKGROUND OF THE INVENTION

This invention relates to ultracentrifuges and particularly to speed dampers for ultracentrifuges. Still more particularly, this invention relates to a solenoid-actuated ultracentrifuge damper that is diesngagable from the drive shaft when the rotational speed attains a predetermined critical value.

Ultracentrifuges are used to separate liquid materials of different densities and solids from liquids by rotating a mixture of materials in a tube at angular velocities of 100,000 revolutions per minute or more. The material having the greatest density, and, hence the greatest inertia will aggregate at the end of the tube furthest from the axis of rotation. If a plurality of materials of differing density are in the tube, they will become arranged in descending order of density toward the axis of rotation.

An important consideration in ultracentrifuge design is the necessity of minimizing stresses upon bearings ued in conjunction with high speed components such as the drive shaft that connects the rotor to the driving mechanism. It is common practice in the design and construction of an ultracentrifuge to make the drive shaft to have a relatively small diameter to provide a degree of flexibility in the drive shaft. Two primary reasons exist for requiring flexibility in the drive shaft.

First, when a user is operating an ultracentrifuge rotor, it is very important to place test samples so as to have a balanced, symmetrical mass distribution about the drive shaft. However, perfect balance is usually impossible; and even small variations have deleterious effects on the operational characteristics of the ultracentrifuge system at angular velocities typically achieved in such systems because the centripetal force on any given mass is proportional to the square of the angular velocity. Even a very small imbalance could cause vibrations that are capable of applying damaging stresses to the high speed bearings that are required to support the shaft. A slight flexing of the drive shaft accommodates the imbalance and prevents application of undesirable stresses to the bearings.

A second reason for providing flexibility in the drive shaft relates to slight geometric limitations inherent in the machining processes used to form the rotor shaft and associated drive mechanism. It is impossible to construct an ideal drive shaft of uniform density and diameter, because there are always tolerances that must be allowed in forming the drive shaft. Furthermore, it is also impossible to perfectly align the drive shaft with the drive mechanism. Although ultracentrifuge components are machined to be very nearly perfect, the nature of the ultracentrifuging process is such that the slightest imbalance or misalignment will become apparent when the system is in use at high rotational speeds. The usual effect of an imbalance or misalignment is unacceptable wear on the drive shaft bearings, which as explained above is relieved by a flexible drive shaft.

However, the use of a thin, flexible drive shaft causes problems in the acceleration of the device to the high speeds required. It is well-known that a thin, elongate shaft rotating about its longitudinal axis has certain natural frequencies of vibration that become apparent at certain critical speeds. The lowest critical speed is a parameter of the centrifuge system and depends primarily upon the shaft stiffness and the rotor mass.

If only one end of the shaft is fixed, that end is always a node, and the free end is always an antinode at the resonant frequencies. In a typical ultracentrifuge, the first resonance occurs at an angular velocity of about 500 RPM. In general, the amplitudes of the second and higher order resonances are out of the operating speed range and have no effect upon the efficacy of ultracentrifuging processes or upon the high speed components of ultracentrifuge systems.

Ultracentrifuge operations require acceleration of the drive shaft to speeds greater than the speed at which the first resonance occurs. If the shaft is not sufficiently stiff, stabilized, or damped, the combination of vibrations caused by unbalanced conditions from the test samples and the structure of the rotor and the resonance may cause deflections of the shaft sufficient to cause damage to the centrifuge and remix the sample.

A possible solution to the difficulties caused by imbalances and resonances in the system is to fix a damper bearing on the thin drive shaft. Fixed dampers must be designed for both low speed and high speed operation and are, therefore, generally limited because of the additional complexity of the dynamics of such designs. Other attempts to solve the problems associated with low speed resonances include journalling the shaft in a plurality of bearings with the amount of bearing surface engaging the rotating shaft being adjustable.

U.S. Pat. No. 2,961,277, issued Nov. 22, 1960 to Sternlicht discloses a bearing system in which a shaft has a frustoconical journal portion intermediate the ends of the shaft, which are supported on fixed bearings. A bearing is mounted on an adjustable support to be movable into or out of engagement with the frustoconical journal. The movable bearing is engaged with the journal before the shaft reaches the critical angular velocity and is disengaged from the shaft after the angular velocity is greater than the critical value.

U.S. Pat. No. 4,205,779, issued June 3, 1980 to Jacobson and assigned to Beckman Instruments, Inc. assignee of the present invention, discloses an ultrcentrifuge drive system that includes a fixed damper bearing. jacobson discloses a cylindrical collar around the shaft. A solenoid actuated bushing having a tapered centering chamber is adapted to move into contact with the collar to laterally support the rotor.

U.S. Pat. No. 3,958,753, issued May 25, 1976 to Durland et al. discloses a centrifuge in which the rotor is driven by an air jet and supported on an air cushion. A solenoid moves a brake member into engagement with a friction bearing mounted on the bottom of the rotor to decelerate the rotor and provide stability to the rotor as it reduces its speed from a high rotational speed to come to rest.

U.S. Pat. No. 3,322,338 to Stallman et al. discloses a centrifuge having a movable bearing assembly carried by a frame that supports a rotatable member coaxially with the axis of rotation of the rotor. The rotatable member is movable between advanced and retracted positions to engage and release the rotor and is formed to engage the rotor to hold it in a defined axis of rotation. Stallman et al. further disclose means for permitting the rotatable member tomove laterally within predetermined limits, thereby damping lateral rotor movement at critical transition speeds.

U.S. Pat. No. 2,951,731 to Rushing discloses a centrifuge having damping means including two sets of concentric, spaced apart cylindrical sleeves. The sleeves are arranged to follow shaft vibrations and overlap with other sleeves that are fixed with respect to the shaft. A viscous liquid is retained between the overlapping sleeves to damp out shaft vibrations.

U.S. Pat. No. 3,902,659 to Brinkman et al. discloses a rotor stabilizing device having an upper bearing formed of a first axially polarized magnetic ring and a second ring including a ferrite material. One of the rings is secured to the rotor, and the other ring is held stationary relative to the rotor. The rings are positioned such that oscillations of the rotor cause eddy currents in aninduction ring, which absorbs the vibrations.

U.S. Pat. No. 3,786,694 to Willeitner discloses a damping device for a centrifuge rotor that is elastically supported by hydraulic oil. The damping device comprises a plurality of coaxial ring magnets and a disc that damp rotor vibrations in the oil.

U.S. Pat. No. 3,430,852 to Lenkey et al. discloses a centrifuge rotor stabilizing device that frictionally contacts the rotor to provide stability at critical speeds.

International application No. PCT/US83/00402 of Beckman Instruments, assignee of the present application, discloses a centrifuge stabilizing bearing that is actuated by a solenoid in response to a specified rotational speed for engagement with a bearing mounted to the rotor.

SUMMARY OF THE INVENTION

The present invention overcomes the difficulties associated with the complex dynamics of fixed damping systems and the vibrational energy dissipation problems associated with the devices that require movement of a bearing relative to the drive shaft to engage a bearing when it is necessary to damp vibrations or to disengage the bearing after the critical speed has been surpassed.

The present invention is directed to a damper system for a rotating device such as an ultrcentrifuge that comprises a rotor supported by a flexible drive shaft connected to a motor by rigid support bearings. The damper system includes a plunger that is concentrically mounted upon the flexible drive shaft. A plunger bearing is mounted to an end of the plunger for selectively contacting a conical drive shaft bearing. The drive shaft bearing is mounted to the drive shaft near the plunger bearing. A magnetic solenoid actuates the plunger to move the plunger bearing into contact with the drive shaft bearing. The plunger applies a constant force against the driveshaft bearing. The solenoid is set to maintain low friction contact between the plunger bearing and the drive shaft bearing for a predetermined angular velocity range.

If the drive shaft tends to vibrate in a plane perpendicular to the axis of rotation, the energy associated with such vibrations is coupled from the drive shaft bearing to the plunger bearing, which is fixed in the plunger. Vibratory energy of the drive shaft is therefore transformed into linear motion of the plunger, which moves longitudinally relative to the solenoid. The inner, generally cylindrical surface of the solenoid is in frictional contact with the plunger such that vibrational energy of the drive shaft is dissipated as heat without damaging the ultracentrifuge system and without substantially interfering with rotational motion of the drive shaft. The system also shifts the critical speed by changing the shaft stiffness.

DESCRIPTION OF THE PREFERRED EMBODIMENT

Figure 1:
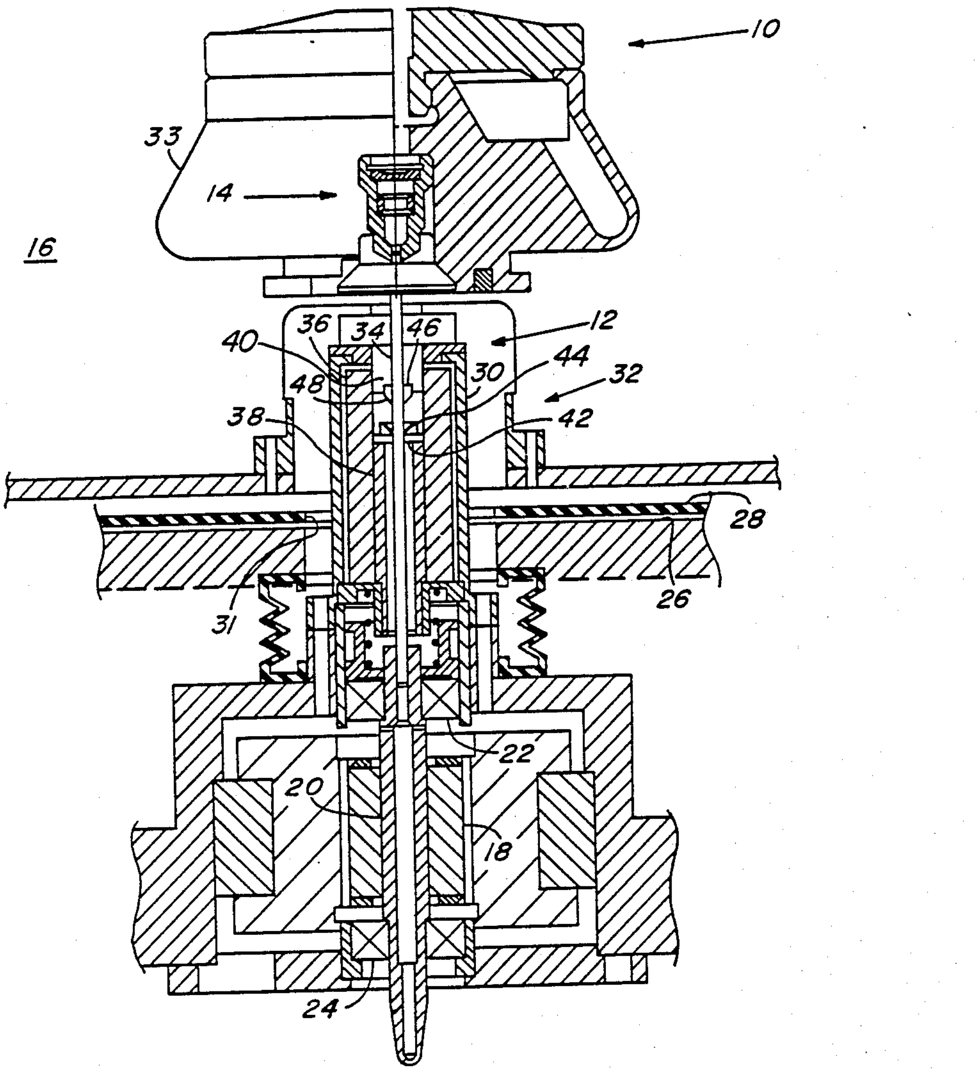
FIG. 1 is a vertical cross sectional view of a centrifuge drive assembly including a disengagable critical speed whirl damper according to the invention.

Referring to FIG. 1, a centrifuge 10 includes a drive spindle assembly 12 and hub assembly 14 that projects from the drive assembly into a rotor chamber 16. The drive spindle assembly 12 extends downward from the hub assembly as shown in the FIG. 1 and is connected to suitable drive means, such as an induction motor 18. As shown schematically in the FIG. 1, the motor 18 includes an armature 20 mounted by an upper high speed bearing 22 and a lower high speed bearing 24. Suitable high speed bearings and motors are well-known in the art so that the structural features of the motor 18, the upper high speed bearing 22 and the lower high speed bearing 24 are not explained in detail herein.

The motor 18 is mounted in a motor housing 26, which as viewed in the FIG. 1 is below a drive mount plate 28. The drive spindle assembly 12 projects through a passage 31 in the drive mount plate 28. The rotor chamber 16 is mounted to an end 30 of the drive spindle assembly 12 that extends away from the motor 18 through the passage 28. The hub assembly 14 is designed to mount a rotor assembly 33 designed to contain a plurality of test samples (not shown) in suitable containers for centrifuging.

The drive spindle assembly 10 includes a drive shaft 34 extending between the armature 20 and the hub assembly 14. The drive shaft 32 preferably has a diameter that may be as small as about 0.078 inch. Such shafts are typically employed in ultracentrifuge systems for driving a relatively small ultracentrifuge rotor 33 that may have a diameter as small as about 4 inches. The small diameter drive shaft 34 is susceptible to flexing and vibration since it serves as a coupling between the hub 14 and the motor 18. In addition, as explained above, the drive shaft 34 may be subjected to vibrations caused by rotor imbalance and limitations in the machining steps involved in forming the centrifuge 10.

A solenoid 36, which preferably comprises a plurality of turns of a suitably conducting wire, is fixed within the drive shaft housing 30 near the upper end thereof. A plunger 38 is slidably mounted within a cylindrical cavity 40 inside the solenoid 36, and a plunger bearing 42 is fixed in and end 44 of the plunger 38. A low-speed drive shaft bearing 46 having a frustoconical portion 48 facing the plunger bearing 42 is fixed to the drive shaft 34 in proximity to the the plunger bearing 42.

The plunger bearing 42 may be selectively moved along the axis of the drive shaft 34 into and out of engagement with the frustoconical portion 48 of the drive shaft bearing 46. Displacement of the drive shaft 34 in a plane perpendicular to to its axis of rotation brings the frustoconical portion 48 of the low-speed drive shaft bearing 46 into contact with the plunger bearing 42. The force between the frustoconical portion 48 and the plunger bearing 42 has a longitudinal component that is generally aligned with the axis of rotation of the drive shaft 34. This longitudinal force component causes the plunger 38 to move within the solenoid cavity 40. The force between the drive shaft bearing 46 and the plunger bearing 42 has a radial component that increase the normal force between the interior of the solenoid 36 and the outer surface of the plunger 38. Friction between the inner surface of the solenoid 36 and the outer surface of the plunger 38 dissipates energy associated with the translational motion of the plunger 38 relative to the solenoid 36 and hence, also dissipates the vibrational energy of the drive shaft 34.

Because the only contact between drive shaft 34 and the damping systems is via the low friction interface of the frustoconical portion 48 of the drive shaft bearing 46 and the plunger bearing 42, the vibrational energy is dissipated without dissipating an appreciable amount of rotational energy of the rotating portions of the centrifuge system 10. This dissipation of vibrational energy external to the rotating system through a low friction contact with the rotating drive shaft 34 is in contrast to previous damping systems that rely upon relatively high friction contacts with the drive shaft. Avoiding high friction contact with the drive shaft 34 prolongs the useful lifetime of the centrifuge system 10 and results in increased operating efficiency.

The plunger 38 should be formed of a material that experiences a force when it is in a magnetic field. It is well known that passing a direct electrical current through a solenoid, such as the solenoid 36, produces a static magnetic field having two opposing poles like an ordinary bar magnet. The polarity of the magnetic field of the solenoid 36 depends upon the direction of the electrical current therethrough, and the magnitude of the magnetic field depends upon the magnitude of the current. The plunger 38 includes a material, such as iron or a ferrite, which experiences a force when it is in a magnetic field. Therefore, controlling the current in the solenoid 36 provides means for controlling the force between the plunger 38 and the plunger bearing 42.

Figure 2:
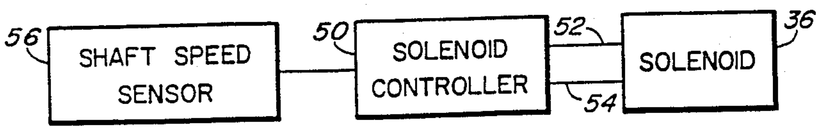
FIG. 2 is a simplified block diagram of a control system for controlling the critical speed whirl damper of FIG. 1.

Accordingly, the centrifuge system 10 includes a solenoid control system 50, shown in FIG. 2, that is coupled with the solenoid 36 by a pair of electrical conductors 52 and 54 for providing electrical current to the solenoid 36. The control system 48 includes a sensor 56 that outputs a signal indicative of the angular velocity of the drive shaft 35. Suitable speed sensing techniques are well known in the art.

The control system 50 is set to maintain the plunger bearing 42 in close proximity with the low speed drive shaft bearing 46 over a predetermined angular velocity range of the drive shaft 34. The angular speed range in which the solenoid 36, the plunger 38, the plunger bearing 42 and the low speed shaft bearing 46 cooperate to damp low speed vibrations of the shaft 34 is typically zero to about 1000 RPM in most ultracentrifuge systems. Starting from rest, the system provides damping until the rotational speed exceeds the first critical speed.

In operating the centrifuge 10 it is necessary to damp out vibrations of the shaft 34 that occur at low speeds because such vibrations could have the detrimental effects of disturbing materials separated from one another in the centrifuging process or damaging the centrifuge 10. It has been found that the critical speed where resonances of the centrifuge system 10 including a very thin shaft 34 as described herein normally occurs at less than 1000 RPM while the shaft 34 is either accelerating from zero to its operational speed or while the shaft is decelerating to a stationary position after a centrifuging operation.

Therefore, as the motor 18 begins to operate to accelerate the shaft 34, the control system 50 provides electrical current to the solenoid 36 tomove the plunger bearing 42 into engagement with the frustoconical portion 48 of the low speed shaft bearing 46. The centrifuge system 10 thus is provided with vibration damping from initial rotation of the drive shaft 34 until the angular velocity of the drive shaft 34 exceeds a predetermined value, typically about 550 RPM. Generally there is no need for damping at rotational speeds above 1000 RPM since rubber drive housing mounts 58 provide adequate damping at such speeds.

The control system deactivates the damping action by reducing the electrical current in the solenoid to a value sufficient to permit the weight of the plunger 38 to move the plunger bearing 42 out of engagement with the low speed shaft bearing 46. After the centrifuge run is complete and the shaft decelerates to the predetermined angular velocity, the control system 50 again activates the solenoid to provide damping until the shaft 34 comes to rest.

What is claimed is:

1. A centrifuge system having a low speed vibration damping system for dissipating transverse vibrational energy external to rotating components of the system, comprising:

a drive shaft for mounting a centrifuge rotor concentrically to an axial direction along said shaft;

driving means for rotating said drive shaft;

a drive shaft bearing fixed to said drive shaft;

a linearly movable bearing assembly slidably movable in the axial direction along said shaft, mounted adjacent said drive shaft bearing;

means for selectively engaging said linearly movable bearing assembly and said drive shaft bearing in low friction contact to convert vibrations of said drive shaft in a plane transverse to the axis of rotation thereof into linear motion of said linearly movable bearing assembly axially of the drive shaft; and means for dissipating energy associated with linear motion of said linearly movable bearing assembly to damp said vibrations of said drive shaft.

2. A centrifuge system according to claim 1 wherein said means for engaging includes:

a tapered portion of the drive shaft bearing extending from said drive shaft bearing toward said linearly movable bearing assembly; and means for positioning said linearly movable bearing assembly in low friction contact with said tapered portion of said drive shaft bearing such that said vibrations cause said tapered portion to exert a force on said linearly movable bearing assembly, said force tending to move said linearly movable bearing assembly relative to said drive shaft bearing.

3. A centrifuge system according to claim 2 wherein said positioning means for includes:

a solenoid having a central cavity therein, said linearly movable bearing assembly being mounted in said central cavity; and means for supplying electrical current to said solenoid to actuate said linearly movable bearing assembly to urge said linearly moveable bearing assembly toward said drive shaft bearing to provide damping of said vibrations over a selected angular velocity range of said drive shaft.

4. A centrifuge system according to claim 3 wherein said linearly movable bearing assembly includes:

a plunger formed substantially as a cylinder having a longitudinal passage therein, said drive shaft extending through said longitudinal passage; and a plunger bearing mounted to an end of said plunger, said plunger bearing contacting said drive shaft bearing to provide low friction contact between said linearly movable bearing assembly and said drive shaft when said linearly assembly is actuated.

5. A method for damping transverse vibrations on a shaft mounted centrifuge rotor wherein said rotor is concentrically mounted to an axially extending drive shaft and rotated thereby; placing a drive shaft bearing on the shaft placing a linearly movable bearing assembly slidably movable in the axial direction along said shaft, proximate the drive shaft bearing;

actuating the linearly movable bearing assembly to make low friction contact with the drive shaft bearing for a predetermined angular velocity range of the drive shaft;

converting vibrations of the drive shaft transverse to the axis of rotation of the drived shaft into linear motion of the linearly movable bearing assembly axially of the drive shaft by means of the low friction contact; and dissipating energy associated with linear motion of the linearly movable bearing assembly to damp the transverse vibrations of the drive shaft.

6. The method of claim 5 further including the steps of:

forming a tapered portion on the drive shaft bearing such that the tapered portion is in low friction contact with the linearly moveable bearing assembly when the linearly moveable bearing assembly is actuated, and urging the linearly moveable bearing assembly to have translational motion relative to the drive shaft in response to transverse vibrations of the drive shaft.

7. The method of claim 6 further including the step of placing a plunger bearing on an end of the linearly movable bearing assembly for contacting the drive shaft bearing when the linearly movable bearing assembly is actuated to damp the transverse vibrations.

* * * * *

UNITED STATES PATENT AND TRADEMARK OFFICE

CERTIFICATE OF CORRECTION

PATENT NO. : 4,846,773

DATED : July 11, 1989

INVENTOR(S) : Robert H. Giebeler and Kenneth K. Inouye

It is certified that error appears in the above-identified patent and that said Letters Patent is hereby corrected as shown below:

| | |
|---|---|
| Column 6, line 54, | after "assembly" insert --axially-- |
| line 57, | after "said" delete "positioning" and after "for" insert --positioning-- |
| Column 7, line 8, | after "linearly" insert --movable bearing-- |

Signed and Sealed this

Nineteenth Day of June, 1990

*Attest:*

HARRY F. MANBECK, JR.

*Attesting Officer*

*Commissioner of Patents and Trademarks*